R. BENEVENTO.
PRESSING DEVICE.
APPLICATION FILED APR. 10, 1919.
1,354,797.
Patented Oct. 5, 1920.
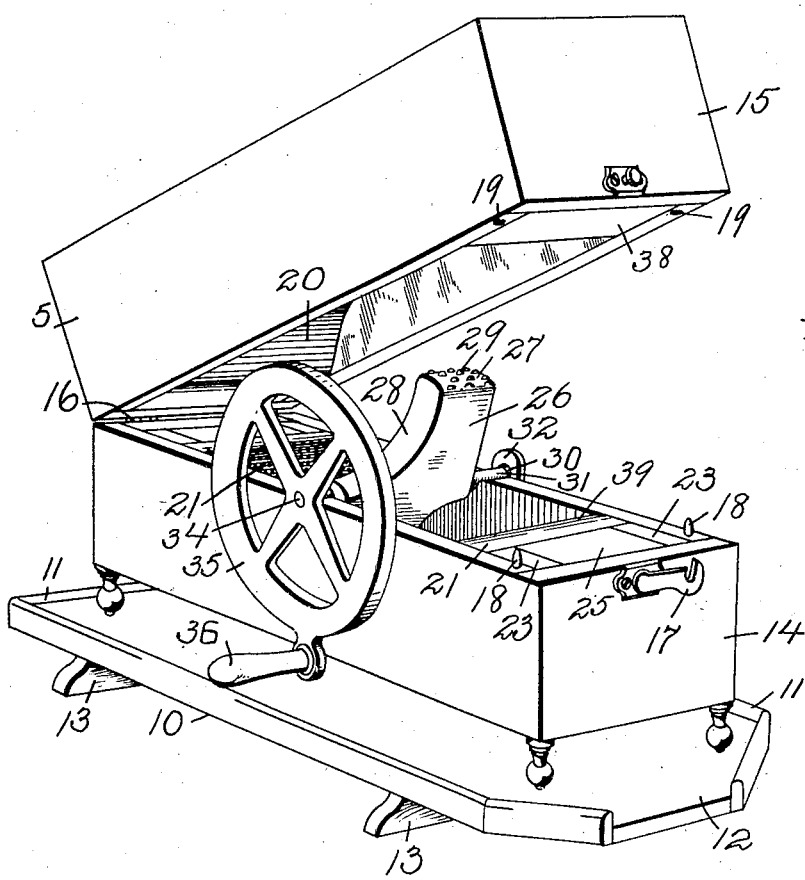
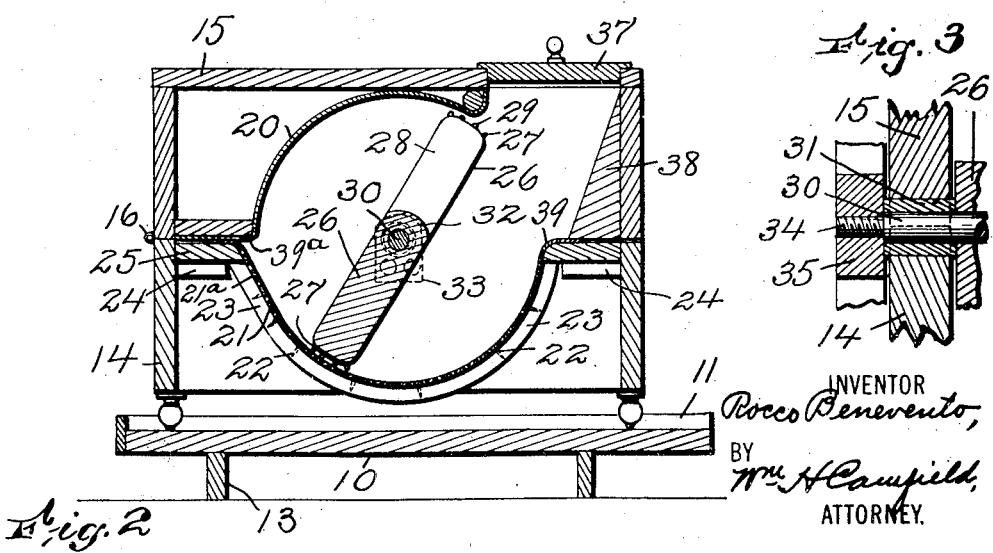
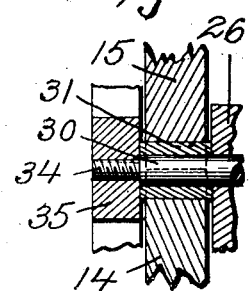
INVENTOR
Rocco Benevento,
BY
Wm H Campfield,
ATTORNEY.

UNITED STATES PATENT OFFICE.

ROCCO BENEVENTO, OF WEST BRIGHTON, NEW YORK.

PRESSING DEVICE.

1,354,797.	Specification of Letters Patent.	Patented Oct. 5, 1920.

Application filed April 10, 1919. Serial No. 288,937.

*To all whom it may concern:*

Be it known that I, ROCCO BENEVENTO, a subject of the King of Italy, and a resident of West Brighton, county of Richmond and State of New York, have invented certain new and useful Improvements in Pressing Devices, of which the following is a specification.

This invention relates to an improved press which is designed to be used in the making of jelly or to produce juice extracts from fruit or vegetables, and also to provide for the delivery of pulp in semi-liquid form.

The invention is designed to provide a press of this kind which is simply constructed, which is easy to operate and which has the added advantage of being separable so that its parts can be well cleaned when desired.

The invention is further designed to provide a press of this kind in which the feeding of material to the press can be done without opening the casing thereof, but which casing can be widely opened to permit the removal of pressed matter or to permit a cleaning of the press, the press having but few working parts and being constructed so as to agitate the material and subject it to pressure in different directions to completely squeeze the juice from the material, and to also force through the perforated bottom any pulp that is of a nature to permit its being squeezed.

One form of the invention is illustrated in the accompanying drawing, in which Figure 1 is a perspective view of the press with the top portion opened to show the interior. Fig. 2 is a central longitudinal section of the machine shown in Fig. 1, and Fig. 3 is an enlarged section of a detail showing the attachment of the agitator and the actuating mechanism thereof.

The device can be mounted on a suitable stand or trough to receive the liquid, such as the juice, that comes from any fruit or vegetable mangled and pressed in the press, although such stand or trough is not essential to the operation of the device, but I have illustrated it mounted on such trough or stand 10, which has a marginal edge 11 that is slightly raised above the bottom of the trough or stand 10 and has an open end 12, through which material can be directed into a suitable receptacle, such as a dish or pail, the trough being mounted on any suitable form of standard 13.

The press itself consists of a bottom part 14 and a top or lid part 15, these being separable and usually fastened together for convenience, as by the hinges 16, and having suitable fastening means, such as a hook 17, although the weight of the part 15 usually holds it in position, any side movement being prevented by the pegs 18 in one member which fit into openings 19 in the other member, so that the parts are held in alinement and the hinges are relieved of unnecessary strain so that they are not loosened. The members have their abutting edges contacting so that there is a tight fit when the cover or top member is closed, and have formed within them a circular chamber, the upper portion thereof being formed by the curved wall 20, usually made of sheet metal and extending from one side wall to the other, the lower part being formed of the sheet metal bottom 21 extending from side to side and fastened by a suitable means, such as the tacks or nails 22, to the side strips 23, the side strips resting at their ends on suitable cleats 24, the ends of the strips 23 being provided with filler blocks 25, the filler blocks 25 and the side strips 23 being fastened together so that the whole bottom part that rests on the cleats 24 can be lifted from the machine when the machine is opened and the rotor or pressing element removed.

This rotor is in the form of a paddle 26, the outer edges 27 of which are proportioned so as to slightly clear the walls 20 and 21, and having on opposite sides of the center, and also on opposite sides of a perpendicular plane, the cut away portion 28.

The faces of the ends 27 are usually roughened, this very often being done by driving staples 29 into the wood of which the paddle is made, thus providing a roughened and abrasive face pressing against the inner walls of the press. The paddle 26 is fastened to a shaft 30 which fits so that half of it, or substantially half of it, is seated in the side walls of the lower member of the casing, and to take up wear, each end of the shaft 30, where it emerges from the paddle 26, is provided with a sleeve 31 which is a little wider than the side wall of the casing. The end of the shaft beyond one of the sleeves 31 is slipped into a perforated ear 32 on the end of a plate 33 fastened to the side of the lower member 14. The other end of the shaft is reduced, this reduced end 34 being screw-threaded and forming a shoulder to limit the screwing of the wheel or crank 35 which is screwed into place on said end 34 and, abutting against the shoulder formed by the reduced end, tightly engages the shaft to turn the shaft on the paddle. The crank or wheel 35 is provided with a suitable handle 36 by means of which it is turned.

The upper member is provided with an opening over which is placed a cover 37, and when the cover is removed, material, such as fruit or vegetables, that is to be ground and pressed is placed into the machine, the wall 38 being formed so as to guide the material toward the rotor or pressing element, the material not being apt to lodge any place as the corners 39 of the lower wall 21 are rounded.

The lower half or bottom of the chamber that receives the material to be pressed is preferably made tangential or a little longer at what might be considered the rear when the handle is turned to the right, so that when the upward moving paddle engages and squeezes the material against the ledge or projection 39ª of the upper part or wall 20 of the chamber, this forms a ledge against which the material becomes lodged and it causes a rearrangement of the material and also provides for increased pressure at the edge of the ledge 39ª, due to the accumulation of material at this place.

It will be evident that when the upper member is closed onto the lower member and material has been deposited in the press, when the rotor is turned each wing or end 27 thereof engages the material to press it against the bottom wall of the inner chamber and squeeze the juice out of it and such pulp as will go through the perforations in the bottom 21, and the cut away parts of the paddle permit material to move laterally in the machine so that it is constantly not only being crushed and given a rotative movement, but is moved from side to side within the machine and is thus assured in a short time of all parts of the mass having been put under the required and proper pressure.

I claim:

1. A press comprising upper and lower members constructed to provide a substantially circular chamber when they are closed, a paddle arranged to rotate in the chamber, the paddle being cut away on opposite sides and on opposite ends to form diagonally disposed openings that do not overlap transversely, whereby none of the material in the chamber is undisturbed during a rotation of the paddle, and a shaft on which the paddle is secured, the shaft being held in place between the members when the members are closed.

2. A press comprising upper and lower members constructed to provide a substantially circular chamber when they are closed, a paddle arranged to rotate in the chamber, and a shaft on which the paddle is secured, the shaft being held in place between the members when the members are closed, part of the walls of the chamber being enlarged so as to abut against an adjacent part to form a shoulder against which material in the chamber is forced by the paddle.

3. A press comprising a bottom member having a perforated curved bottom wall extending from side to side, side strips supporting the wall, supports on which the ends of the side strips rest to permit removal of the wall, one end of the wall being of larger radius, an upper member to fit on the lower member and having a curved top wall, the member having an opening in the wall to permit the feeding of material, the members having provision for the bearing of a shaft between them when the members are closed, and a paddle on the shaft.

4. A press comprising a bottom member having a perforated curved bottom wall extending from side to side, side strips supporting the wall, supports on which the ends of the side strips rest to permit removal of the wall, one end of the wall being of larger radius, an upper member to fit on the lower member and having a curved top wall, the member having an opening in the wall to permit the feeding of material, the members having provision for the bearing of a shaft between them when the members are closed, and a paddle on the shaft, the paddle being adapted to slightly clear the walls of the members and having cut away portions on its ends and on opposite sides.

In testimony that I claim the foregoing, I have hereto set my hand, this 7th day of April, 1919.

ROCCO BENEVENTO.